US012458293B2

(12) United States Patent
Nixdorf et al.

(10) Patent No.: US 12,458,293 B2
(45) Date of Patent: Nov. 4, 2025

(54) MRI-COMPATIBLE JAW OPENING DEVICE FOR TMJ IMAGING

(71) Applicant: REGENTS OF THE UNIVERSITY OF MINNESOTA, Minneapolis, MN (US)

(72) Inventors: Donald Nixdorf, Minneapolis, MN (US); David Nascene, Minneapolis, MN (US); Viraj Rajanayagam, Minneapolis, MN (US); John William Bedford, Minneapolis, MN (US); Katelyn Fitzgerald, Minneapolis, MN (US); Holly Hayden, Minneapolis, MN (US); Darren Seaney, Minneapolis, MN (US)

(73) Assignee: REGENTS OF THE UNIVERSITY OF MINNESOTA, Minneapolis, MN (US)

( * ) Notice: Subject to any disclaimer, the term of this patent is extended or adjusted under 35 U.S.C. 154(b) by 142 days.

(21) Appl. No.: 18/231,354

(22) Filed: Aug. 8, 2023

(65) Prior Publication Data
US 2024/0050040 A1    Feb. 15, 2024

Related U.S. Application Data

(60) Provisional application No. 63/396,468, filed on Aug. 9, 2022.

(51) Int. Cl.
*A61B 5/05* (2021.01)
*A61B 5/00* (2006.01)
*A61B 5/055* (2006.01)

(52) U.S. Cl.
CPC ............... *A61B 5/70* (2013.01); *A61B 5/004* (2013.01); *A61B 5/055* (2013.01)

(58) Field of Classification Search
CPC ............ A61B 5/70; A61B 5/055; A61B 5/004
See application file for complete search history.

(56) References Cited

U.S. PATENT DOCUMENTS 4,834,112 A    5/1989   Machek et al.
4,909,502 A    3/1990   Beeuwkes, III et al.
(Continued)

OTHER PUBLICATIONS

Atos, TheraBite® Jaw Motion Rehabilitation System™, Retrieved from https://www.atosmedical.com/products/therabite-jaw-motion-rehabilitation-system, Copyright 2024 Atos Medical, 3 pages.
(Continued)

*Primary Examiner* — Joel F Brutus
(74) *Attorney, Agent, or Firm* — QUARLES & BRADY LLP

(57) ABSTRACT

An apparatus for providing controlled jaw opening, including: a curved track attached to a first end of a housing; a first bite tray and a second bite tray coupled to the curved track, at least the second bite tray being slidably coupled to the curved track; and an adjustment mechanism disposed within the housing and coupled to the second bite tray, the adjustment mechanism including an extended handle disposed within the housing and extending from a second end of the housing opposite the first end, the extended handle being configured such that movement of the extended handle causes the second bite tray to move along the curved track.

20 Claims, 6 Drawing Sheets

(56) References Cited

U.S. PATENT DOCUMENTS

| | | | | |
|---|---|---|---|---|
| 4,979,519 | A | * | 12/1990 | Chavarria .............. G01R 33/28 |
| | | | | 433/44 |
| 5,158,096 | A | * | 10/1992 | Clark .................... A61B 5/107 |
| | | | | 73/379.03 |
| 5,361,506 | A | | 11/1994 | Beeuwkes, III |
| 5,456,703 | A | | 10/1995 | Beeuwkes, III |
| 5,846,212 | A | | 12/1998 | Beeuwkes, III et al. |
| 2014/0114146 | A1 | * | 4/2014 | Hanewinkel .......... A61B 5/394 |
| | | | | 600/301 |
| 2022/0168610 | A1 | * | 6/2022 | Kazmi ................. A63B 23/032 |

OTHER PUBLICATIONS

Boston Gear: A Regal Rexnord Brand, Worm Gears, Retrieved from https://www.bostongear.com/products/open-gearing/stock-gears/worm-gears, Copyright 2023 Boston Gear, 3 pages.

Farkas et al., Geography of the nose: a morphometric study, Aesthetic Plastic Surgery, 1986, 10:191-223.

McKesson, MR Imaging Device Medrad TMJ-200™, GE Healthcare #E8802F, Retrieved from https://mms.mckesson.com/product/647573/GE-Healthcare-E8802F, Accessed on Oct. 17, 2021, 2 pages.

Softonic, Lego, Lego Digital Designer—Download, Retrieved from https://lego-digital-designer.en.softonic.com/, Copyright 1997-2024 Softonic International S.A., 10 pages.

Stanford University, Biomimetics and Dexterous Manipulation Laboratory, CrawlerNotes, Retrieved from http://bdml.stanford.edu/Main/CrawlerNotes#toc10, Page Last Modified on Jan. 28, 2019, 8 pages.

U.S. Department of Health & Human Services, U.S. Food & Drug Administration, 510(k) Premarket Notification, Device Classification Name: Cephalometer, Retrieved from https://www.accessdata.fda.gov/scripts/cdrh/cfdocs/cfPMN/pmn.cfm?ID=K870243, Accessed on Feb. 5, 2022, 3 pages.

* cited by examiner

MRI-COMPATIBLE JAW OPENING DEVICE FOR TMJ IMAGING

RELATED APPLICATIONS

This application claims priority under 35 U.S.C. § 119 to U.S. Provisional Patent Application No. 63/396,468 filed on Aug. 9, 2022, the entire contents of which is incorporated herein by reference.

BACKGROUND

The most commonly used method for diagnosing disorders in the temporomandibular joint (TMJ) is magnetic resonance imaging (MRI) with a head coil. However, there are currently challenges associated with this process, primarily in regard to standardized, passive opening of a patient's jaw during imaging. There are presently few options in terms of devices for this task, and no MR-compatible device exists which can both passively open a patient's jaw with rotational motion (the preferred, natural motion of jaw opening) and provide a readout of critical measurement data, such as the interincisal distance at maximal jaw opening. There is a need by radiologists and dentists need to obtain accurate, standardized measurements of the full range of jaw opening (particularly rotational opening) during MR imaging for TMJ disorder diagnosis.

SUMMARY OF THE INVENTION

Accordingly, new systems, methods, and apparatus for providing controlled jaw opening are desirable.

Thus, in certain embodiments the disclosure provides an apparatus for providing controlled jaw opening, including: a curved track attached to a first end of a housing; a first bite tray and a second bite tray coupled to the curved track, at least the second bite tray being slidably coupled to the curved track; and an adjustment mechanism disposed within the housing and coupled to the second bite tray, the adjustment mechanism including an extended handle disposed within the housing and extending from a second end of the housing opposite the first end, the extended handle being configured such that movement of the extended handle causes the second bite tray to move along the curved track.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1:
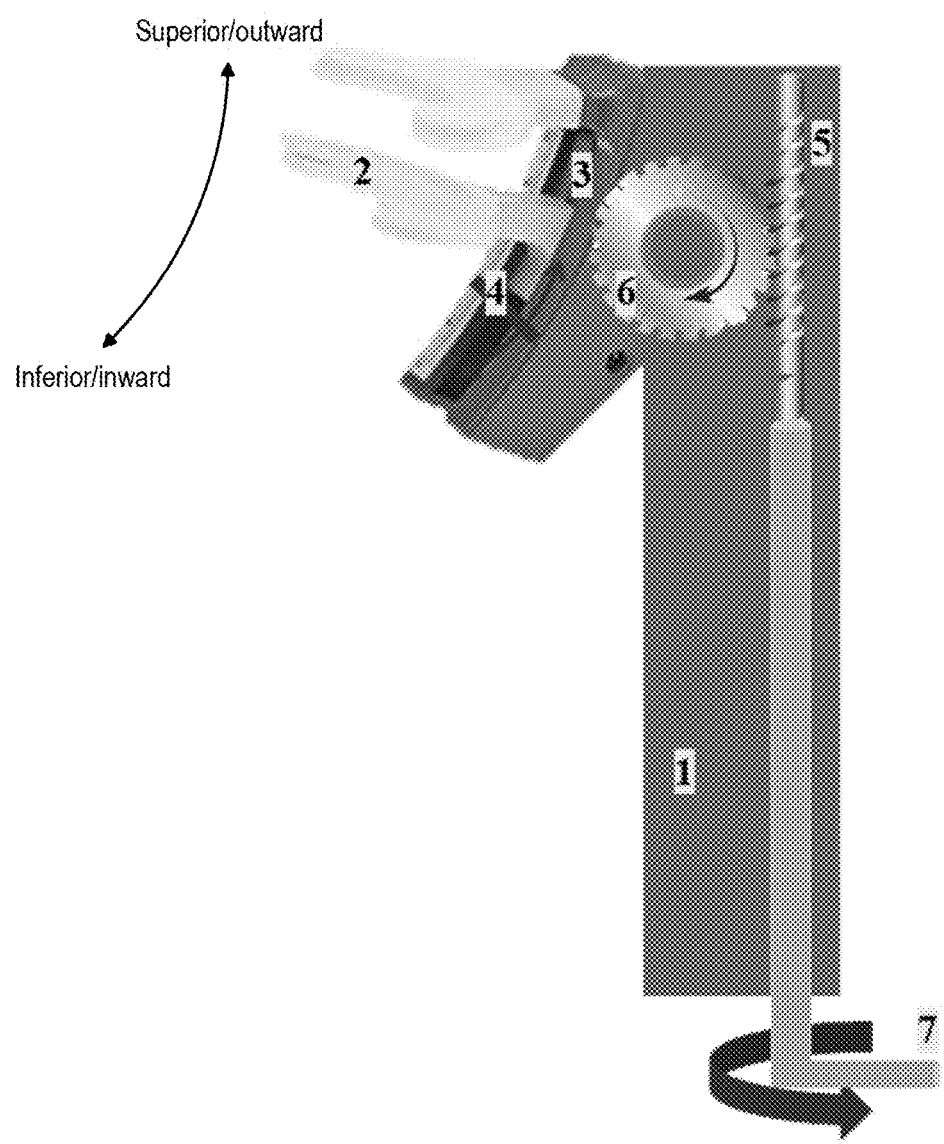
FIG. 1 provides a visual representation of an embodiment which includes an extended handle (1), bite trays (2), curved track for motion of the lower bite tray (3), slidable measurement tracker (4), worm drive system (5 and 6), and a handle for patient-guided movement of the lower bite tray via rotation (7).

In accordance with some embodiments of the disclosed subject matter, mechanisms (which can include systems, methods, and apparatus) for providing controlled jaw opening are provided.

In various embodiments, the disclosed device is used to gradually open a patient's jaw (following a path of motion which helps them to obtain their maximal opening) while images of their temporomandibular joint (TMJ) are collected in an MRI head coil apparatus for temporomandibular disorders (TMD) diagnosis and monitoring. The device also provides information on interincisal distance at a patient's maximal jaw opening, which can be critical for tracking of disease progression/treatment. The operating process is as follows. While a patient lies supine within an MRI head coil apparatus, they hold the handle of the device at chest level with one hand and use their other hand to rotate a lever that extends out of the bottom of the device. The upper portion of the device contains bite trays on which the patient's lower and upper teeth rest upon. As the device's lever is rotated, the lower bite tray is translated downwards along a curved track and gradually opens the jaw in increments of 2 mm per rotation of the lever. A measurement bar is also pushed along the track to record the patient's interincisal opening distance. Once the patient has reached their maximal opening, they may either rotate the lever backwards to return the device back to its starting point or pull a release mechanism within the handle to immediately close their jaw. The measurement bar remains at the maximal opening distance, providing a readout of this value to MRI technicians.

According to various embodiments, elements of the device include the particular curvature of the moving track that is controlling the opening the jaw, the handle/release mechanism that disengages the mechanical gear system, the top mouthpiece that rests at the top of the device, and the measuring bar/notch system.

Overall, there is a lack of devices in market that can passively and rotationally open and support a patient's jaw while being used in an MRI machine while images are being collected. When patients are being diagnosed with TMD or their progression with TMD is being measured, an MM scan with a head coil setup is the most common way for clinicians to obtain images of the TMJ and jaw. Images need to be collected at the following points: when the patient's jaw is completely closed, at an intermediary point of jaw opening, and at the patient's maximum jaw opening. The maximum opening which a patient can attain is a key value which is used by clinicians to track patient progress and regression with TMD. The disclosed device can help clinicians complete all of these tasks.

One way in which the disclosed device differs from the existing technology is that it is designed to meet the safety constraints of MRI systems and the spatial constraints of an MRI head coil apparatus. Namely, it is made of entirely nonferrous and MR-compatible materials and has a vertical profile rather than projecting a significant distance off of a user's face. The only other device which meets these requirements is the Medrad TMJ-200 device, which relies on an entirely different mechanism of jaw translation (clicking vs. rotating). The Medrad device works by opening a patient's jaw via a clicker on the handle of the device which is controlled by the patient. There are several drawbacks to this device: it only facilitates translational motion for jaw opening, which often fails to obtain a patient's true maximal opening, it does not provide a clear readout of a patient's maximal opening, and it has limited resolution in intermediary opening distances. Additionally, the disclosed device presents several features which are not present in the Medrad TMJ-200 device, including a pull-activated emergency release system, a sliding measurement tracker which maintains a maximal opening distance readout after imaging has concluded, and a higher resolution with regards to opening increments. For example, the Medrad device opens in increments of 10 mm, while the disclosed device provides increments of <5 mm, or preferably <2 mm. Oftentimes, no specialized device will be used for jaw opening during an MRI scan, and a medical syringe will be used to prop open a patient's jaw instead. This approach has several issues: it cannot continuously open a patient's jaw to varying distances, it may not obtain patient's true maximal jaw opening or provide this measurement as a readout, and it does not facilitate rotational motion of the jaw. Embodiments of the disclosed device address one or more of the shortcomings of the other devices. The device facilitates natural rotational motion at the beginning of jaw opening so that patients can reach their true maximal jaw opening, providing a more consistent measurement. The device opens a patient's jaw gradually (e.g., in increments less than 10 mm measured by interincisal distance). The device is simple and small enough to use within the confines of an MM head coil and is MR-safe. The device provides MM technicians with a readout of a patient's maximal jaw opening distance at the end of an MM scan for use by clinicians in diagnosis/treatment. The device is usable by a wide range of patients (pediatric to geriatric) including those with conditions such as arthritis.

The target market for embodiments of the device is radiologists and dentists who need accurate jaw-opening measurements during the MR imaging process for TMD. One 2007 article stated "3-7% of the population seeks treatment for pain and dysfunction of the TMJ or related structures." Thus, approximately 17 million people in the U.S. seek treatment for TMJ disorders. MRI is the primary means of diagnosing TMD because it does not expose patients to ionizing radiation and it provides images of soft tissue.

There are additional areas of opportunities where this product could be sold. MM head coil manufacturers could package this product when selling a head coil as both products are needed for this purpose. This could also extend to MM machine manufacturers such as Siemens, who may want to package all of these products together. This is all to say that there is a specific target market of MRI clinics, but there are many additional pathways in which this product could be sold.

An embodiment of the device has been tested for ergonomic use, MRI compatibility, accurate and consistent jaw openings, withstanding passive jaw force, and emergency release operation. The collected data shows that the device is MRI compatible, meets the spatial constraints for the most globally used MRI head coil (32 coil bird cage), and has several other advantageous features. The device is able to open the jaw incrementally (~3 mm or less steps) to maximal opening and ensure the jaw follows the proper curved path. The measurement tracking bar makes consistent measurements of opening. A rotational feature can be used to minimize the mobility constraints of geriatric populations who have arthritis and pediatric patients who have less strength than adults. The device can also support the average force applied by the jaw (~80 N) and allow for complete jaw closure. Moreover, use of the device can be stabilized by one hand, making it compatible with MM safety requirements. The device can also be reassembled quickly and features an emergency release mechanism to allow for quick jaw closure.

A worm drive system can be disposed within the housing. The worm drive system includes a worm drive that meshes with one or more worm gear. The worm drive may extend through the device handle to form a rotating crank. The crank is coupled to the worm drive such that rotation of the crank causes a rotation of the gear drive. The worm gear has a fixed center axis and rotates around the center axis as it is driven by rotation of the worm drive. The worm gear is also meshed with the slidable bite tray. For example the slidable bite tray may have a curved base that sits in the curved track. The bite tray may extend from the base away from the curved track and gear. On the opposite side of the base, all or part of the surface of the base may be disposed with teeth that are dimensioned to fit into the gear spaces of the worm gear. The worm gear may be meshed with these teeth such that rotation of the gear causes the base and bite tray to slide along the curved track.

A second bite tray, which may be stationary, extends from the curved track. The stationary bite tray may be positioned superior to the sliding bite tray. In an initial position, the sliding bite tray may abut the stationary bite tray so that the jaw or mouth of the subject can fully or nearly fully close when in use in this position. This may advantageously allow for MRI images to be acquired of the subject's closed jaw.

The bite trays may be advantageously removable from the curved track. For example, the bite tray may be removeable such that bite trays of various sizes may be attached to the device. In this way, the bite tray may be fit to the subject (e.g., providing small, medium, and large, etc. bite trays) or custom molded for each specific subject. For example, the bite trays may include two impression molds, upper and lower, which may be permanently or removably coupled to the curved track and sliding piece or base, respectively. In addition, removal of the bite trays may facilitate sterilization between uses. The bite trays may removably snap fit with the bite tray base. Additionally or alternatively, the bite trays may be disposable such that a new and sterilized bite tray may be attached to the device for each individual subject.

In this way, rotation of the crank causes rotation of the worm drive, which causes rotation of the gear. The rotating gear interacts with the teeth of the sliding bite tray base causing the bite tray to slide along the curved track. In use, the crank can be slowly turned to slide the inferior bite tray in the inferior/inward direction, causing the subject to slowly open their jaw. To close the jaw, the crank may be turned in the opposite rotational direction in order to cause the sliding bite tray to slide in the superior direction towards the "closed" position. In addition, the release can be used to disengage the worm gear from the bite tray, as will be described in further detail below.

The worm gear may also be optionally coupled with one or more additional gears coupled by an axis. Such additional gears may rotate in conjunction with the worm gear. The additional gears may mesh with the bite tray base, providing additional points of contact with the worm drive system and the bite tray. These additional contact points may improve the robust and smooth motion of the bite tray as the crank is rotated.

Figure 5:
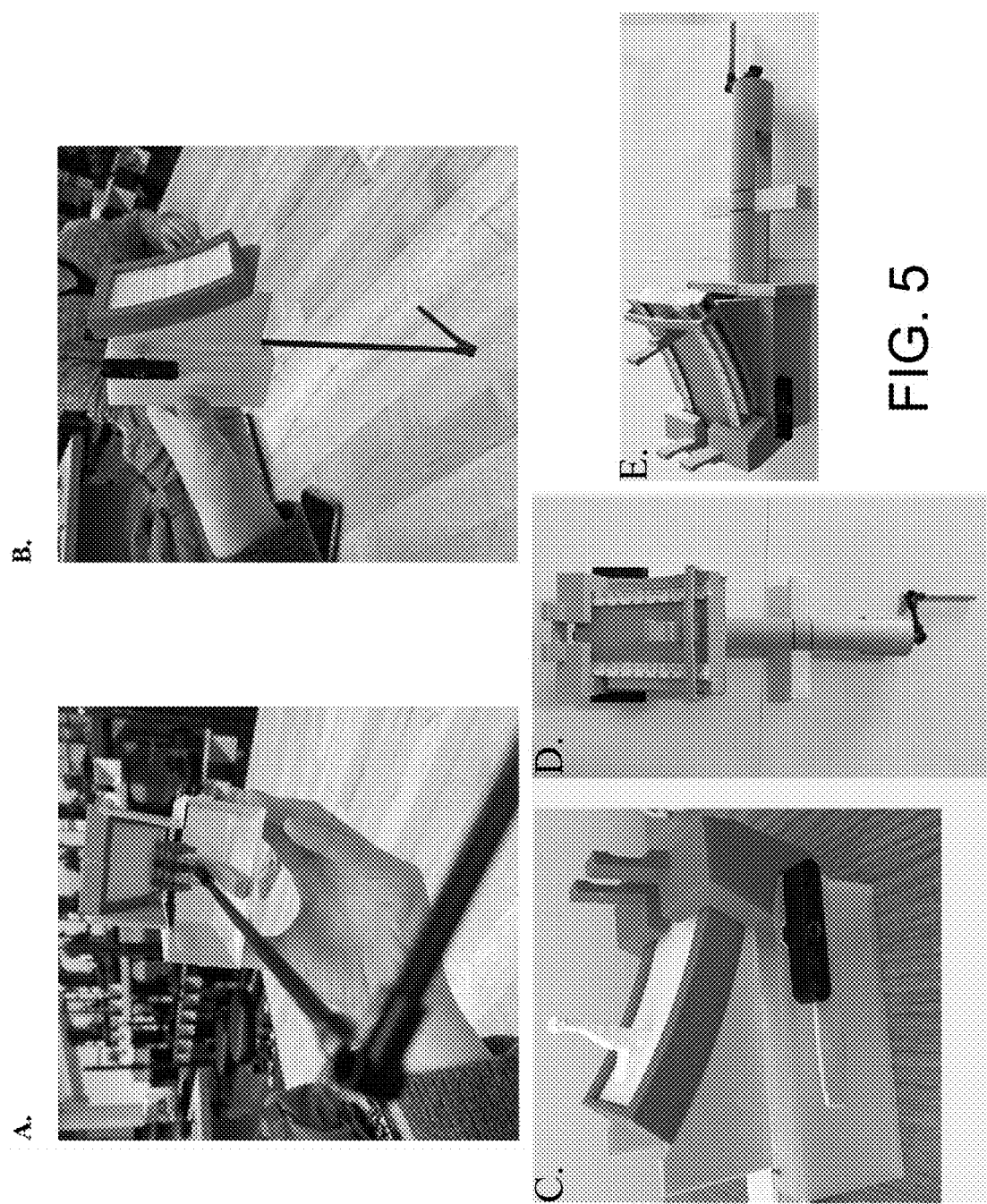
FIG. 5 shows pictures of an embodiment of the device. Panel A: View of the underside of an embodiment to demonstrate sliding piece/gear/worm drive interaction and "popsicle stick" release mechanism, Panel B: Side view of an embodiment depicting sliding piece in the "fully open" position, Panel C: Side view of an embodiment showing the mouthpiece components in place, Panel D: Front view of another embodiment, Panel E: Side view of the embodiment of Panel D.

The gears may be removably meshed with the teeth of the bite tray base to provide a release of the device by allowing the patient's jaw to close if necessary. For example, the worm gears may be positioned to abut the bite tray base using a spacer placed in the base, as shown in FIG. 5 panel A, for example. The spacer can provide pressure to the worm gear system such that it meshes with the teeth of the bite tray base. In use, the spacer can be removed by sliding the spacer outward. When the spacer is removed, the gears may fall away from the bite tray (i.e., "un-mesh"), removing the pressure on the bite tray and allowing the subject to close their jaw. This provides an emergency release for the subject to pull in an emergency situation (e.g., the subject is in pain) or to end the exam.

The device may also include a measurement tracker. The measurement tracker can be used to identify the distance by which the sliding bite tray has moved in use. The distance tracker may be slidably coupled to the curved track. The distance tracker slides along the curved track when a sufficient pressure is applied. As the bit tray moves in the inferior direction, it can apply a sufficient force to the distance tracker, shifting it along the curved track in the inferior/inward direction. The distance tracker will remain at the maximally reached distance until the device is reset by applying a sufficient force to the distance tracker along the superior/outward direction to its initial position.

In use, a subject can engage with the device by biting down on the bite tray. In this way, the subject's top teeth will engage with the stationary bite tray, resting the top teeth on the superior surface of the superior bite tray. The subject's bottom teeth can engage the sliding bite tray, resting the bottom teeth on the inferior surface of the inferior bite tray. In an initial position the bite trays may be touching or nearly touching to allow the subject to close their jaw. The patient can slowly rotate the crank to cause the subject's mouth to open by placing an inferior/inward pressure on the subject's bottom teeth as the sliding bite tray slides in the inferior/inward direction. The one-way nature of the worm drive will prevent the subject from closing their jaw without releasing the worm drive or turning the crank in the opposite direction.

As the subject opens their jaw, the measurement tracker will slide to the maximum position the jaw was opened and remain in this position until the device is reset. The measurement tracker may align with a ruler or other readout of the maximum distance the jaw was opened. Such ruler may be positioned along the edges of the curved track. The distances of the ruler may measure the curved distance that the measurement tracker is displaced or may be calibrated to correspond to the interincisal distance of the jaw opening. The measurement ruler may also be calibrated with other therapeutic devices used in the field for treatment, measurement, etc.

Accordingly, FIG. 1 shows an example of an improved, MM-compatible jaw opening device for TMJ imaging. Briefly, the device relies on the rotation of a worm drive 5 via a patient-controlled crank 7 at the end of an extended handle 1, which rotates a worm gear 6 that interacts with a curved, sliding piece in a track 3. A lower bite tray 2 is attached to the sliding piece, and as the piece is moved up and down by the gear, the patient's jaw is opened or closed passively. At maximal jaw opening, a measurement tracker 4 becomes fixed in place along a scale, tracking interincisal distance to provide a quantitative readout to Mill-technicians.

The worm drive 5, worm gear 6, and crank 7 form a worm drive system. The gear 6 in this system interacts with a sliding piece that slides in the track 3 to allow for movement of the lower bite tray 2, and therefore the patient's jaw.

The curved track 3 and sliding piece are curved to guide a patient through anatomically-correct rotational jaw opening. The sliding piece sits in the curved track 3 and interacts with the gear 6 to move along the track 3 in a superior/outward (which may be referred to as "up") to inferior/inward (which may be referred to as "down") direction. As a non-limiting example, all or some of the curved track 3, sliding piece, gear 6, worm drive 5, and crank 7 can be 3D-printed out of a material such as PLA plastic.

Some embodiments of the MM-compatible jaw-opening device provides a curved sliding track to allow for rotational motion of the jaw. The long slender shape of some embodiments can provide compatibility for use in an Mill head coil (see FIG. 5). The device's mechanism differs from existing devices, as the device utilizes a twisting motion with a worm drive system. In contrast, the MedRad and Therabite devices use clicking and squeezing mechanisms, respectively. This embodiment works as such: when the crank on the bottom of the device is spun or rotated, it rotates the attached worm drive inside an enclosed case (which, in some embodiments and for prototyping, may be made from Lego components for ease of assembly and testing). This worm drive then rotates a family of three gears in a controlled fashion, which mesh with matching teeth on the back of the sliding piece (3D-printed out of PLA plastic). When these teeth interact with the gears, the sliding piece moves up or down the curved track (also 3D-printed out of PLA plastic) at 1.6 mm per turn. An emergency release mechanism may also be included at the back of the worm drive system: when the release (which may be constructed from a stack of popsicle sticks in some embodiments) is pulled, the gears disengage from the curved track teeth and eliminate the frictional force holding the device open. The system may also be optimized ergonomically, including a casing enclosing the rotating shaft that the subject can use to hold the device in use. The device may be dimensioned to be light enough to be held on one hand and to be small enough to fit inside an MM head coil for jaw imaging with an MM system.

Figure 2:
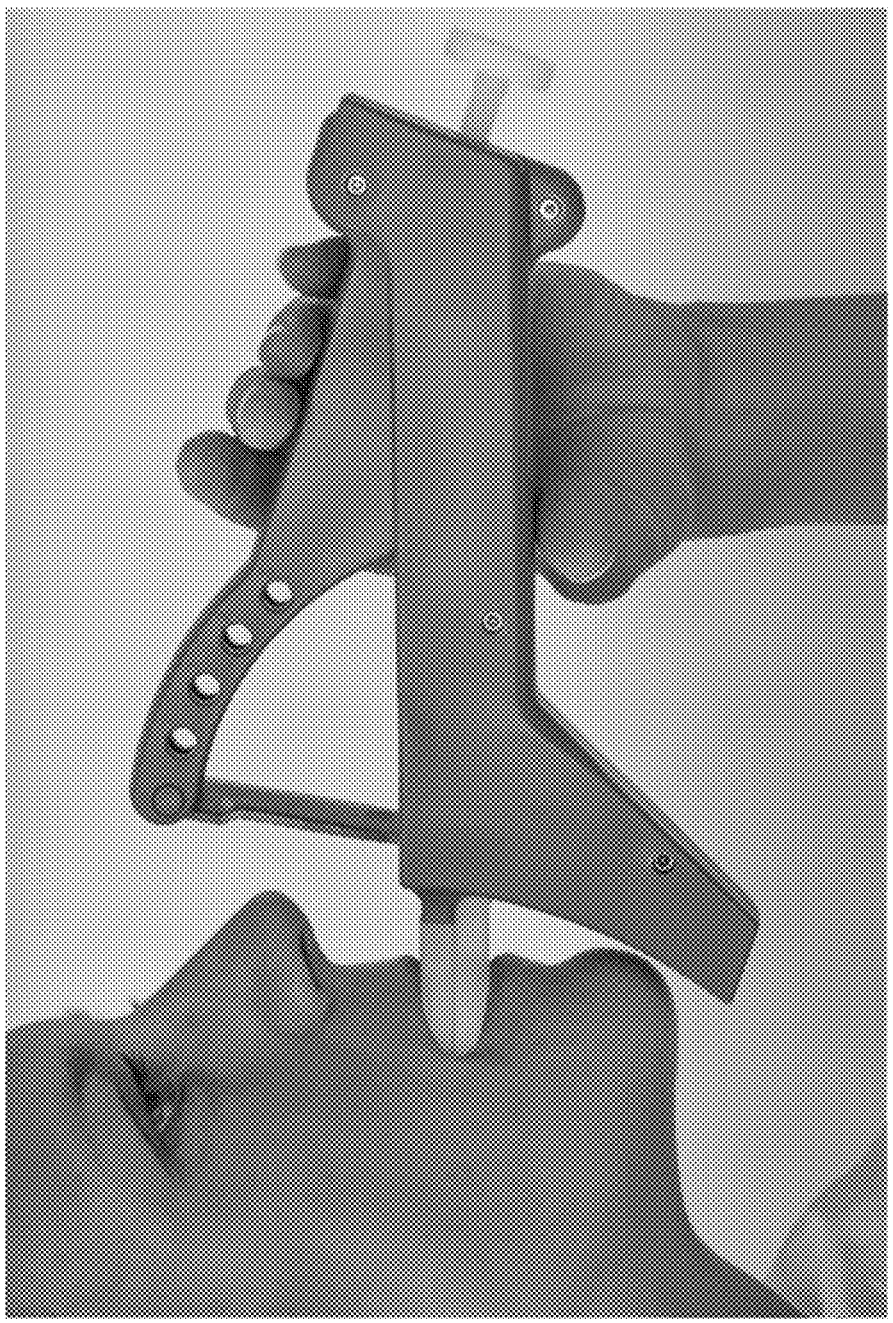
FIG. 2 provides an image of an existing jaw rehabilitation device that may be used to estimate the correct curvature of the track and sliding piece used in some embodiments and calibrate measurement of jaw opening, for example.

In some embodiments, the curve that the sliding piece follows in the embodiment was based in part from existing devices in this space, including for example the device shown in FIG. 2. This curvature is used in rehabilitation to teach patients how to open their jaw with rotational motion first, rather than "cheating" and immediately using translational motion. It is expected that implementing this curve into an MM diagnostic tool will allow for a more standardized opening pattern and an increased maximal jaw opening for patients. Given that the equation for the curve is not publicly available, we have developed our own estimate. For estimation purposes, it was assumed that the woman pictured in FIG. 2 had average facial dimensions for a Caucasian female. Then, using anthropological data, it was determined that measurements of average nasal protrusion, the distance from the top and the bottom of the nose to the bottom of the chin are 19.3 mm and 65.5 mm, respectively. These dimensions were taken to be the maximum horizontal and vertical dimensions of the curve. With these maximum dimensions and assumptions, MATLAB's grabit( ) function was used to gather x vs. y data for the curve. With this data, the curve was determined to be closely approximated as 23° of a circle with a 200 mm radius. This curvature was used when designing and 3D printing the curved track and sliding piece for an embodiment of the device.

To determine the spacing of gear teeth on the sliding piece of the device, features of the corresponding Lego worm gear were utilized, which it was intended to mesh with. The gear diameter was found to be 20 mm, not including the height of the teeth (this is known as the diametrical pitch). Using this value, and the fact that the gear had 24 teeth, the module (pitch divided by the number of teeth) was approximated to be one, which was supported by the fact that Lego gears are all marketed as having this module value with a pressure angle of 20°. Dividing the calculated circumference of the gear by 24 provided the spacing distance between the middle of each tooth, and this value was found to be 2.62 mm. In some embodiments, this was adjusted to 3 mm to account for slight inaccuracies or bending of PLA plastic during 3D-printing. Other gear sizes and numbers of teeth may be used with corresponding meshing teeth provided on the bite tray.

Since patients may be biting down on the bite trays as the device is operating and opening their jaw, it was desired that the mechanism of the device operate in one direction only. The twisting motion by the patient should move the sliding piece, but the patient should not be able to move the sliding piece back into the close jaw configuration by simply biting down (or "up" in this case). This led to the selection and implementation of a worm drive system, as the immense friction between the single spiral worm drive and the gear prevents the gear from rotating the drive, and therefore fixes the sliding piece in place even when force is applied in the opposing direction. Additionally, worm drive systems allow for a low-speed gear ratio that is ideal for the high-resolution jaw opening desired for the device. Through testing of one embodiment, it was found that one rotation of the shaft by a user correlates to $\frac{1}{24}$ rotation by the worm gear, and a movement of 1.6 mm by the sliding track. This proved more than sufficient for the goal of having a resolution of at least 10 mm.

The release mechanism of the device may be constructed of a material that provides a spacer; for prototyping purposes, popsicle sticks were used as spacers in some embodiments. Since patients will likely be in pain when they reach their maximal jaw opening state, it is important to have a fast way to return the sliding piece to the closed jaw-configuration. In some embodiments, the release mechanism or other release member (e.g., popsicle stick in the prototype) can be pulled out of the device by the user, disengaging the gear system from the sliding piece and allowing it to freely move in the track. This release mechanism is advantageously simple, giving patients confidence in using the device. The release may also be a default setting that is engaged once maximal opening is reached so that patients are in pain for as short a duration of time as possible. In some embodiments, a spring system may be used in the release mechanism, where the spring may be made of MR-compatible materials, as this could allow for easy disengagement and reengagement of the gear with the sliding piece.

Figure 3:
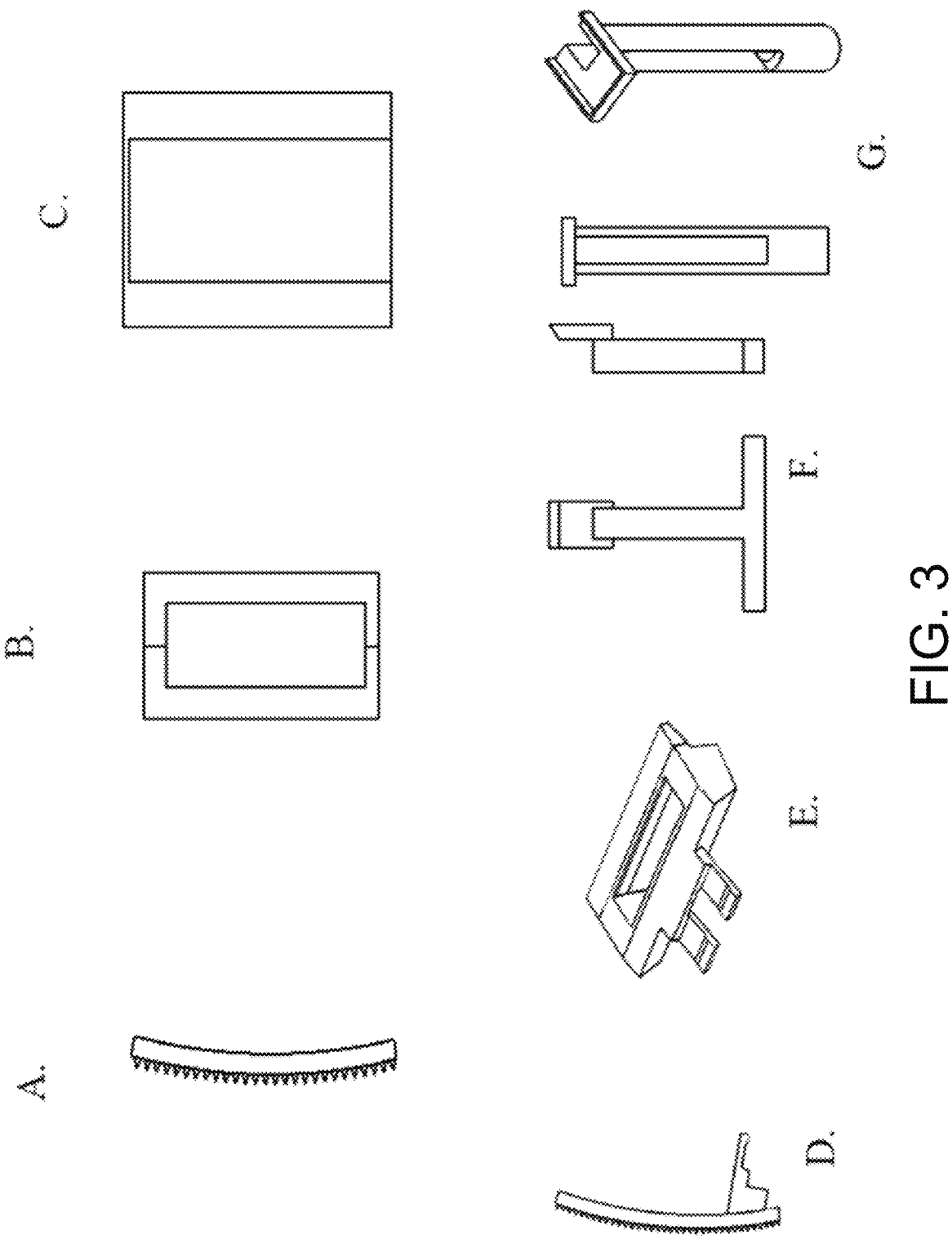
FIG. 3 shows SolidWorks drawings of several components of an embodiment of the device, which were 3D-printed. Panel A: Drawing of the curved sliding piece with teeth to mesh with the worm gear, Panel B: Drawing of the track to contain the sliding piece with an open back for gear/sliding piece interaction, Panel C: Drawing of the box to enclose the gear mechanism and support the track/internal components, Panel D: Curved Sliding Piece with a radius of approximately 196 mm where curvature was calculated based on existing devices using software (MATLAB) and where the mouthpiece thickness was made to be 3 mm, Panel E: Top mouthpiece design which fits tightly around the track and overhangs the top of the box, made to be sturdy and thick, Panel F: Emergency release mechanism including large handles to make it easier to pull and a slanted end for easy sliding when reassembling, Panel G: Extended handle component including a cut-out path for the emergency release mechanism to slide through and a smaller hole for the Lego handle (see below), having an overall cylindrical shape for ergonomics.

Several device components may be designed in a 3D computer aided drawing software and manufactured by 3D-printing. In some embodiments, these components include the sliding piece or bite tray base that interacts with the gear mechanism, the curved track, and the box enveloping the internal mechanism and connecting to the track. FIG. 3 provides example drawings of these parts created in SolidWorks, which may be used in some embodiments of the device. Dimensions are labeled in units of millimeters to highlight the sizes of components and show how they fit and work together.

Figure 4:
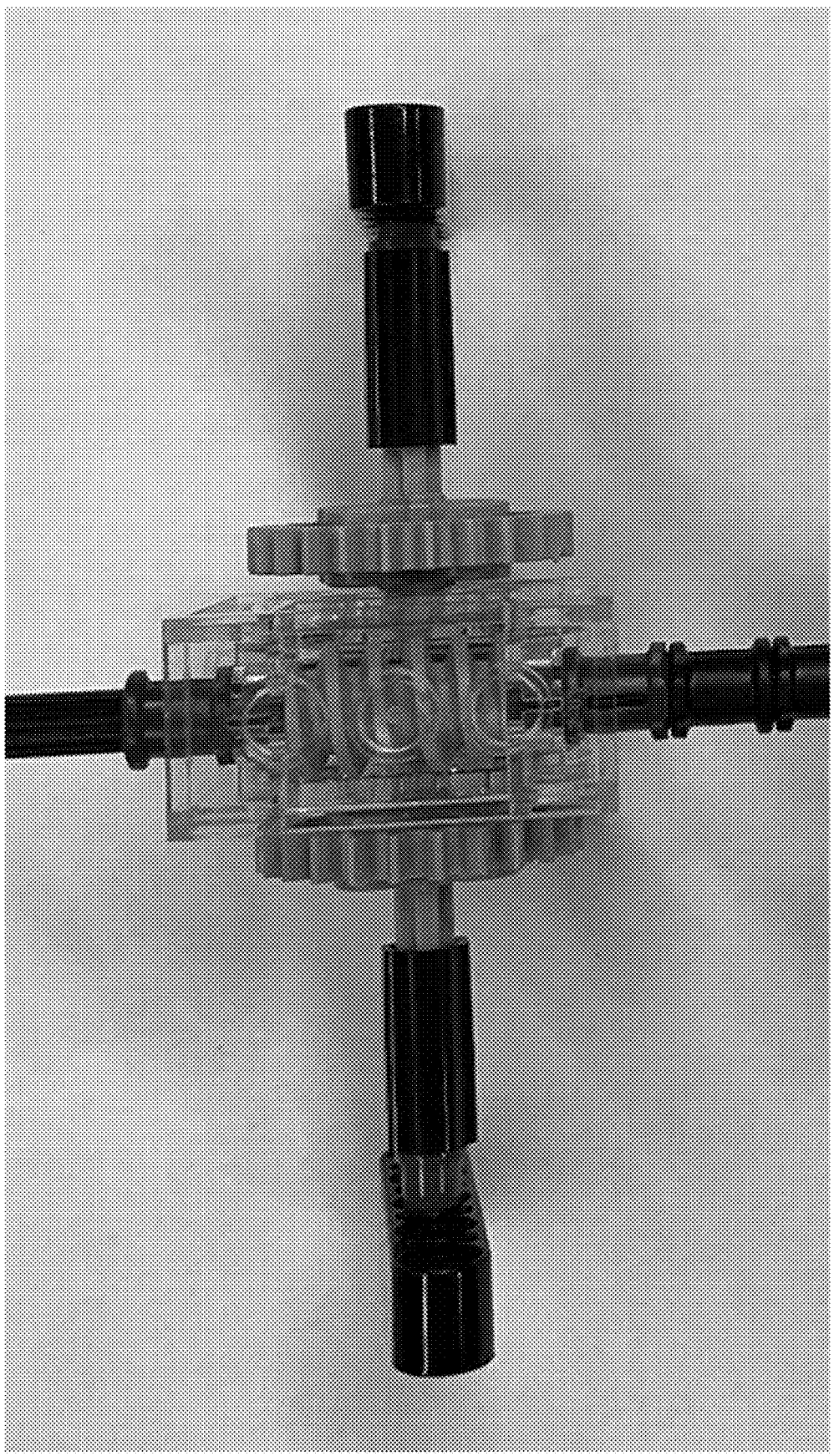
FIG. 4 shows the implemented worm drive system, constructed of Legos for prototyping purposes, with a worm drive and a family of three gears controlled by a shaft. All components are made of ABS plastic.

The setup of the worm drive system was constructed from Legos in the embodiment shown in FIG. 4. The Lego system was first modelled LEGO Digital Designer 4.3 to determine the parts needed. The Legos were then purchased from an online vendor, and the worm drive and primary gear are contained in a clear casing. Two additional gears were added onto the primary gear's axle to increase stability and contact with the sliding piece. An extended shaft piece was connected to the worm drive to allow for manipulation/rotation of the device by the user outside of the space in which imaging is taking place. Lego beams were utilized to join the Lego parts to the 3D printed frame.

Several advantages of the embodiment pictured in FIG. 4 were identified. This embodiment provides a functional worm drive that successfully interacts with the sliding piece within the curved track. This embodiment includes a functional Lego worm drive controlled by a rotating axle and a corresponding family of 3 worm gears that successfully and stably mesh with the 3D-printed sliding piece. This meshing allows the sliding piece to move up and down within the curved track smoothly, as prompted by rotation of the shaft by a user. Additionally, the embodiment provides a curved track that accurately modeled the natural motion of rotational jaw opening.

The embodiment shown in FIG. 5 was constructed from MR-compatible materials, including PLA and ABS plastics, super glue, and wooden materials like popsicle sticks, and meets minimum safety requirements for use with an MRI system. The embodiment is encased by a 3D-printed PLA plastic box which has holes for the various axles and shafts to fit into, providing a robust device. Other embodiments may use alternative MR-compatible materials that may provide more structural integrity and allow for sterilization by autoclaving or alcohol wipes. The device scale may be reduced in other embodiments, and details such as exact gear ratios and overall device dimensions may be altered.

Validation Studies

Figure 6:
FIG. 6 shows images related to testing and validation. Panel A shows the process of weight testing, Panel B shows tests related to precise jaw opening and complete closure, Panels C and D show tests of MRI compatibility.
Figure 6:
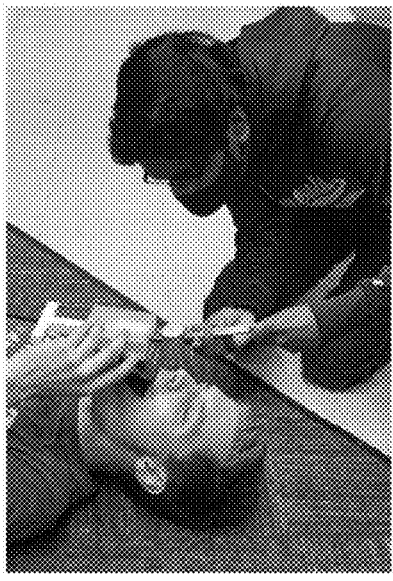
Figure 6:
Figure 6:
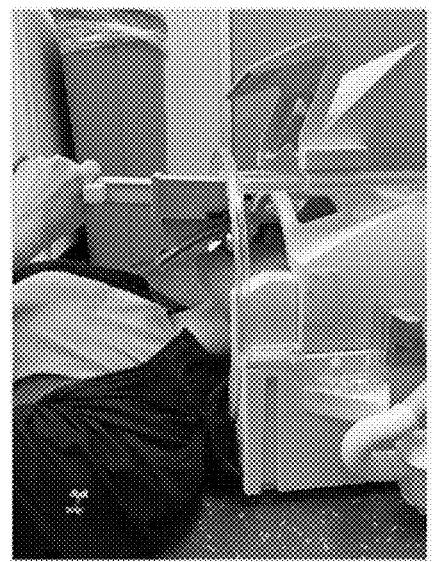

FIG. 6 shows images related to testing and validation of an embodiment of the device. FIG. 6A shows the process of weight testing of the device. Because the human jaw is able to exert an immense amount of force, and the device must be able to withstand the average passive bite or biting force. This was found to be ~80 N, and our device was able to support 80.1 N.

FIG. 6B shows tests related to precise jaw opening and complete closure. This test combined several requirements. It served as a precise jaw opening test (to ensure the device measurement aligned with actual jaw opening), as well as ensuring that the device allowed for complete jaw closure. This also verified the device could be stabilized by a single hand, which is an MRI safety requirement.

FIGS. 6C and 6D show tests of MRI compatibility. This embodiment is MRI-safe, fits inside a 32-channel bird cage head coil, and is able to be operated while inside an MM scanner. Other tests that were performed include tests of the release mechanism deployment, reassembly speed, biocompatibility, and sterility of the device.

Thus, in various embodiments the device may include one or more of a curved track to guide the jaw during opening, a release mechanism, an ergonomic handle, and moving measurement bar, although various embodiments of the device may include subsets of these features.

The main issue during the design, 3-D printing, and construction phases of this project was ensuring proper component dimensions to allow for a cohesive construction of the device. The design process of the sliding piece (see FIG. 3A) presented the greatest challenge, as the overall device functionality depends on its interaction with the worm drive system. Despite taking initial measurements of the teeth on the Lego worm gear, it was difficult to obtain truly accurate values as the curved edges of the gear did not allow for simple linear measurements. When later designing the teeth for the sliding piece on SolidWorks, the length of the top portion of the teeth was set to 1.26 mm and the shape was made into a trapezoid with straight edges. However, after 3-D printing the piece and testing its interaction with the gear, the two pieces were unable to rotate together due to the gear teeth not being able to fully insert themselves between the teeth on the sliding piece. The straight lines seemed to inhibit motion as well. When designing the teeth for another embodiment, the top part of the teeth was drastically reduced to 0.2 mm and the spacing between them was increased slightly. Along with this, all edges were fileted to produce rounded edges for better meshing. When printed and tested again, the sliding piece and worm gear interaction worked perfectly as both the gear and curved piece could synchronously mesh and rotate together.

When first designing and printing the track for the curved piece to slide in (see FIG. 3B), there was not enough space in between the top and bottom faces for it to slide smoothly, causing the piece to get stuck. Along with this, the track had to be printed with plastic support due to its geometry, and the removal of this support proved to be extremely difficult and produced cracks. The track also had minimal thickness, making it very fragile. In subsequent designs, the track face spacing was increased by 2 mm, the thickness was increased, and the component was printed in two halves so that no support would be needed during the printing process. With these improvements, the curved piece was able to slide smoothly within the track.

Some embodiments include a box that supports the axles and connects with the track. While printing a first iteration, the box detached from the build plate of the printer because of warping, so the print needed to be canceled. Fortunately, the main exterior of the box was already printed when this occurred. The curved edges were the only parts that were not able to be printed so they were reprinted and glued onto the track piece. However, the box width was too narrow and the horizontal gear axle could not fit. After another round of measurements, the box was redesigned and printed. The width was increased and holes were inserted into the faces of the box so that the axles could slide through and attach to the exterior. A raft was also utilized in the 3D printing process, which served as the bottom surface layer. This ensured that any warping that could occur would impact the raft layer and not the actual component. These changes allowed for successful assembly of components in the box.

Some embodiments of the device include a crank that connects to the axle that turns the worm drive. When the crank handle is turned, the axle that runs through the worm drive turns, which causes the rotation of the worm drive. With the rotation of the worm drive, the worm drives meshes with a gear connected to two other gears (making a three gear family) and rotates this gear family. The three-gear family interacts with the sliding piece that controls the movement of the patient's jaw. When the gears rotate, the teeth of the gears mesh with the teeth on the back of the sliding piece, moving it up or down along the curved track. The sliding piece continues to move down the track until it reaches the bottom or until the gear family no longer meshes with the teeth on the back of the tray. The worm gear system is fixed to the top and sides of the mechanism cabinet in a manner that allows the rotational motion of the axle to continue to drive the gear system but holds it in place so that the handle does not move out of place when the patient is using the device. The top of the track includes an opening in some embodiments so the sliding piece is able to start at a higher position and ensure a whole range of jaw motion.

In various embodiments, the distance that the device protrudes outward from a patient's face may be reduced to 5 cm or less to be compatible with typical MRI head coils. This distance may be reduced by reducing the size of the housing or decreasing the worm gear diameter. Additionally, ergonomic aspects of the device can be tested by having users of various ages and abilities use the device in a supine position to assess whether they are comfortable and can effectively manipulate the twisting mechanism. The handle and device size may be modified to improve patient comfort.

In various embodiments, the device will be configured to allow for an increased maximum friction/normal force exerted by the worm gear. Increasing the maximum normal force before slipping will help to minimize the risk of the patient being able to move the track backwards in order to close their jaw from their opening position, which could be dangerous and cause the patient's jaw to close quickly and unexpectedly. Additionally, testing using weights suspended from the proposed sites of bite trays will be used to assess whether the current materials provide enough structural integrity to withstand the potentially high bite force exerted by patients. It is important to assure that the device will not break, as fractured pieces within the mouth could be a choking hazard for the patient.

Additionally, in other embodiments the device may have a stronger and more stable handle. The handle may also have an ergonomic shape. The handle may be encased in a box, which may be similar to that which contains the worm gear system and curved track/sliding piece in other described embodiments. This can ensure that a patient can hold it while rotating the handle. For example, the axel may be secured to the handle using Lego beam pieces. Also, a sliding measurement bar and scale, as described above, may be included to allow for standardized measurements of maximal jaw opening at the end of an MRI scan.

Thus, while the invention has been described above in connection with particular embodiments and examples, the invention is not necessarily so limited, and that numerous other embodiments, examples, uses, modifications and departures from the embodiments, examples and uses are intended to be encompassed by the claims attached hereto.

What is claimed is:

1. An apparatus for providing controlled jaw opening during an MRI scan, comprising:
   a curved track attached to a first end of a housing;
   a first bite tray and a second bite tray coupled to the curved track, at least the second bite tray being slidably coupled to the curved track; and
   an adjustment mechanism disposed within the housing and coupled to the second bite tray,
      the adjustment mechanism including an extended handle disposed within the housing and extending from a second end of the housing opposite the first end,
      the extended handle being configured such that movement of the extended handle causes the second bite tray to controllably move along the curved track away from the first bite tray to provide rotational jaw opening.

2. The apparatus of claim 1, wherein the extended handle comprises a worm drive,
   wherein the adjustment mechanism comprises a worm gear meshed with the worm drive, and wherein the worm gear is coupled to the second bite tray such that rotation of the extended handle causes the second bite tray to move along the curved track.

3. The apparatus of claim 2, wherein the rotation of the extended handle causes the second bite tray to move along the curved track by an interincisal distance of ≤2 mm.

4. The apparatus of claim 1, further comprising a measurement tracker slidably coupled to the curved track,
   wherein the measurement tracker is configured to mark a point of maximal jaw opening.

5. The apparatus of claim 1, wherein the curved track is configured to provide rotational motion of a jaw of a subject when the subject engages with the first bite tray and the second bite tray.

6. The apparatus of claim 5, wherein the adjustment mechanism is configured to prevent the jaw of the subject to close when the subject engages with the first bite tray and the second bite tray.

7. The apparatus of claim 6, wherein the adjustment mechanism is configured to withstand a biting force of at least 80 N.

8. The apparatus of claim 1, further comprising a release mechanism configured to disengage the adjustment mechanism from the second bite tray.

9. The apparatus of claim 1, wherein the apparatus is made of MR-compatible materials and configured to be used during an MRI scan.

10. The apparatus of claim 1, wherein the apparatus is configured to have an initial position in which the second bite tray abuts the first bite tray, allowing for complete jaw closure when a subject engages with the first bite tray and the second bite tray.

11. The apparatus of claim 1, wherein the apparatus is configured to be stabilized by a single hand when a subject engages with the first bite tray and the second bite tray.

12. The apparatus of claim 1, wherein the first bite tray and the second bite tray are removably coupled to the curved track.

13. The apparatus of claim 1, wherein the apparatus protrudes no more than 5 cm from a face of a subject when the subject engages with the first bite tray and the second bite tray.

14. A method for controllably opening a jaw of a subject during an MRI scan, the steps of the method comprising:
   inserting an apparatus into a mouth of the subject, wherein the apparatus comprises:
      a curved track attached to a first end of a housing;
      a first bite tray and a second bite tray coupled to the curved track, at least the second bite tray being slidably coupled to the curved track; and
      an adjustment mechanism disposed within the housing and coupled to the second bite tray, the adjustment mechanism including an extended handle extending from a second end of the housing opposite the first end; and
   moving the handle, thereby causing the second bite tray to controllably move along the curved track away from the first bite tray, and thereby controllably opening the jaw of the subject with rotational motion.

15. The method of claim 14, wherein the extended handle comprises a worm drive meshed with a worm gear of the adjustment mechanism coupled to the second bite tray; and wherein moving the handle comprises rotating the handle, thereby causing the second bite tray to move along the curved track away from the first bite tray.

16. The method of claim 15, wherein one rotation of the handle causes the jaw of the subject to open by an interincisal distance of 2 mm or less.

17. The method of claim 14, wherein the apparatus further comprises a release mechanism; and wherein the method further comprises pulling the release mechanism, thereby disengaging the adjustment mechanism from the second bite tray and allowing the jaw of the subject to close.

18. The method of claim 14, further comprising acquiring magnetic resonance imaging images of the jaw of the subject using a magnetic resonance imaging system while the apparatus is inserted into the mouth of the subject.

19. The method of claim 14, further comprising placing a head of the subject into a magnetic resonance imaging head coil and fitting the apparatus into the magnetic resonance imaging head coil to insert the apparatus into the mouth of the subject.

20. The method of claim 14, further comprising stabilizing the apparatus in the mouth of the subject by holding the apparatus with a single hand.

* * * * *